US008527423B2

(12) United States Patent
Holwerda

(10) Patent No.: US 8,527,423 B2
(45) Date of Patent: Sep. 3, 2013

(54) METHOD FOR TRANSMITTING AN INFORMATION STREAM UPON REQUEST FROM A RECEIVING SITE

(76) Inventor: Denny Holwerda, The Hague (NL)

(*) Notice: Subject to any disclaimer, the term of this patent is extended or adjusted under 35 U.S.C. 154(b) by 772 days.

(21) Appl. No.: 12/308,834

(22) PCT Filed: Jun. 26, 2007

(86) PCT No.: PCT/EP2007/005646
§ 371 (c)(1),
(2), (4) Date: Apr. 15, 2009

(87) PCT Pub. No.: WO2008/000441
PCT Pub. Date: Jan. 3, 2008

(65) Prior Publication Data
US 2009/0288171 A1      Nov. 19, 2009

(30) Foreign Application Priority Data
Jun. 27, 2006  (EP) ..................... 06013201

(51) Int. Cl.
*G06F 17/00*    (2006.01)
(52) U.S. Cl.
USPC ............. 705/51; 725/31; 725/5; 726/26
(58) Field of Classification Search
USPC ............................................. 726/26
See application file for complete search history.

(56) References Cited

U.S. PATENT DOCUMENTS

| 5,903,721 | A | * | 5/1999 | Sixtus | 726/2 |
| 5,930,777 | A | | 7/1999 | Barber | |
| 6,483,553 | B1 | | 11/2002 | Jung | |
| 7,134,131 | B1 | * | 11/2006 | Hendricks et al. | 725/31 |
| 2003/0028622 | A1 | | 2/2003 | Inoue et al. | |
| 2006/0053079 | A1 | * | 3/2006 | Edmonson et al. | 705/59 |

FOREIGN PATENT DOCUMENTS

| EP | 0 933 892 A2 | 8/1999 |
| WO | 02-32139 | 4/2002 |
| WO | WO-02/31701 A2 | 4/2002 |

OTHER PUBLICATIONS

Rosenblatt B., et al.: "Digital Rights Management, Passage", Digital Rights Management: Business and Technology, New York, NY: M&T Books, US, 2002, pp. 79-88, 95, XP002341140; ISBN: 0-7645-4889-1.

* cited by examiner

*Primary Examiner* — Calvin L Hewitt, II
*Assistant Examiner* — John M Winter
(74) *Attorney, Agent, or Firm* — Harness, Dickey & Pierce, P.L.C.

(57) ABSTRACT

A method for transmitting information streams from a transmitting site of a provider to a receiving site of a user, the method including: providing a plurality of information streams stored at the transmitting site; providing a variety of different communication channels for transmitting an information stream; generating and allocating authorizations to the information streams at the transmitting site; generating an overview of the information streams available; transmitting the overview to the receiving site; acquiring, by the user, an authorization from a source other than the transmitting site in preparation for selecting an information stream; selecting an information stream and requesting transmission of it from the transmitting site by submitting the acquired authorization allocated to the selected information stream from the receiving site to the transmitting site; and selecting a communication channel and transmitting the selected information stream over it from the transmitting site to the receiving site.

32 Claims, 2 Drawing Sheets

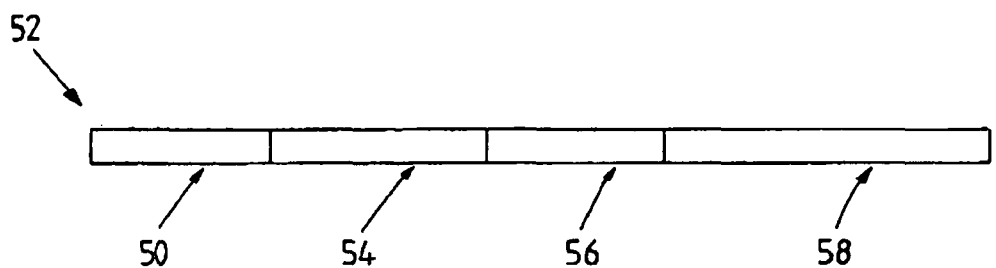

METHOD FOR TRANSMITTING AN INFORMATION STREAM UPON REQUEST FROM A RECEIVING SITE

BACKGROUND OF THE INVENTION

1. Field of the Invention

The present invention relates to a method for transmitting an information flow which is stored ready for retrieval upon request from a receiving site, wherein an overview of the available information is prepared and provided for retrieval by assigning an authorization.

2. Discussion

Methods of this type are known from video on demand and pay TV. The user receives a decoding device from an operator site upon payment of fee which allows him to use this service for a predefined paid period. Download stores on the Internet are also known from which music, or videos, can be downloaded to a computer ready for playing upon payment. It proves disadvantageous that the known methods are extremely limited with respect to the available selections. For example, it is not possible to play a video from an Internet store over the broadband network on a television. In addition, the known methods are linked to the fact that the information flows to be sent are not only digital in nature but are also in a predetermined data format.

SUMMARY OF THE INVENTION

Consequently, the object of the present invention is the further development of a method of this type such that its flexibility and user friendliness are improved.

The solution proposed by the present invention is to provide a communications channel to transmit a selected information flow, to select the desired information flow and transmit said stream to a predefinable receiving site.

The invention makes it possible for the first time to predefine at the receiving site the communications channel for transmitting the selected information flow. The method is no longer tied to only a single communications channel, or to a set type of communications channels, but can cross different technologies and be applied to almost any type of communications channels. The communications channel can be a satellite channel or a cable channel, for example, it can also be a telephone line, a connection in a cellular phone network, a wireless link, a visual communications link or similar. The actual selection of the communications channel can be made by the recipient contacting the transmitting site over a communications channel that he specifies so that the transmission of the information flow can be initiated. The transmitting site can then commence with the transmission of the information flow over the communications channel selected by the receiving site.

Provision can also be made for the transmitting site to send a message to the receiving site at the start of the transmission of the information flow stating on which channel the transmission of the information flow is to take place. This makes sense in the event that the communications channel selected by the receiving site for making contact is not suitable for transmitting the information flow. This can be the case when the communications channel does not possess the necessary bandwidth to transmit the information flow. The transmitting site keeps the information flows ready for retrieval so that they can be transmitted more or less immediately upon request from a receiving site. The transmission speed is preferably matched to the requirements of the receiving site, particularly with respect to playback speed. The communications channel can be configured as a cross-border communications channel. The transmitting and receiving sites can belong to different countries.

The request is made based on an authorization which can be configured, for example, as a general code or as an individual code. A general code can be provided, for example, to permit time-restricted access to all available information flows. An individual code may contain restrictions in this regard or be intended only for one or more individual information flows. An information flow can be created by playing music or a video movie, for example, or an interactive computer game or similar. The authorization can be valid for single or several movies or pieces of music, for example, by providing an authorization code or similar key. The authorization can also be created by dialing a toll number, a dialer or similar communications address. In this instance, a predefinable telephone number is dialed by the receiving site and the information flow is transferred in the desired way for the duration of the connection. Another provision can be that an authorization is activated by means of additional authentication technologies, such as entering a password in a secure area, so that a requested information flow is transmitted. The authorization can include a selection code targeting one information flow or a category of information flows. The assignment of an authorization code word can be linked, for example, to the agreement to carry out a payment transaction.

It is proposed in a further development that the information flow is transmitted in digital or analog form. This makes it possible to communicate information flows that were previously available only in analog form. In addition, the transmission can be adapted to the available communications network or communications channel. Combinations of different types of communications channels can be conjoined to transmit the information flow from the transmitting to the receiving site. As a result, the method in accordance with the invention becomes of interest to small communications networks and local providers since an existing communications network can be used for the method in accordance with the invention.

It is proposed in a further embodiment that the information flow is transmitted with a time restriction. For example, the authorization is valid only within a predefinable time window. The information flow can be transmitted only within this time period. In addition, an additional provision can be that the starting and finishing point of the time window can be determined by the receiving site. For example, the time window starts when the transmission of the information flow commences. The time window preferably has a time range which includes the scope of the information flow, preferably exceeding it by a specific, definable amount. For example, the time window exceeds 50% of the time period required for the transmission of the information flow.

It is further proposed that the information flow is transmitted subject to controls. This allows the transmitting site to halt communication of the information flow, to repeat segments of the information flow or even to cancel communication of the information flow. In this way, the transmitting site can also predetermine the start of a time period or point in time in the future for the transmission of the information flow. In any case, this function can be linked to a corresponding authorization for it to be carried out. The authorization for said function can have a code which releases the control of the receiving site through the transmitting site.

One proposal is that recipient commands are used to control transmission of the information flow. Under this proposal, the commands are communicated by the receiving site over a telephone line, the GSM network, the EDGE network or similar to the transmitting site. One possibility is that a playback device at the receiving site has function keys by means of which the desired commands can be activated. For example, commands for fast forward, rewind, pause, replay and similar can be provided.

An advantageous proposal is that the provision of the communications channel is predefinable by the receiving site. In this way it is possible for the receiving site to decide which communications channel is to be used. The communications channel can be the Internet, a telephone line, a TV cable network, a GSM network, a UMTS network, an EDGE network (Enhanced Data Rates for GSM Evolution; a further development of the GPRS data service) or similar. The communications channel can be configured for a transmission of information in accordance with definitive standards such as DBV-T, DBV-C, DBV-S and others. The Internet can preferably have available a data highway such as DSL. For example, the receiving site connects to the transmitting site over a telephone line and specifies the TV cable network as the communications channel for the transmission of the information flow. In this way, the most cost-effective communications link can be selected by the recipient.

It is further proposed that the information flow is transmitted at least partially in parallel over the communications channel. The communications channel in this embodiment is suitable for a partially parallel transmission of information. Such communications channels can be, for example, multi-wire lines, multi-channel transmission by radio or visual transmission paths, specifically point-to-point radio links or also packaged data transmission over the Internet and similar. The communications channel can be configured wirelessly or through a WLAN or a Wimax network. This not only allows the transmission speed for the information to be increased, but in addition multiple use can be made of the communications channel in time or frequency multiplexing. In this way, costs can be reduced.

In an advantageous further development, it is proposed that a bidirectional communications channel be used. The possibility exists of contacting the transmitting site from the receiver's end over the bidirectional communications channel and the transmission of the information flow is initiated. The information flow can be communicated over the same channel only from the transmitting site to the recipient. During the transmission, the opportunity exists on the receiving side to send control commands over the same channel to the transmitting site in order to control the transmission of the information flow in the way desired.

In addition, the recipient's commands can be communicated over a separate communications channel to a transmitting site. For example, commands from the recipient can be communicated over a separate telephone line to the transmitting site. To do this, a second communications link to the transmitting site can be set up over the land line network, the EDGE network, the GSM network or similar, over which the appropriate commands can be routed.

In a further embodiment of the present invention, it is proposed that several transmitting sites are used. For example, the information flows are stored ready for retrieval distributed over a plurality of transmitting sites. Provision can made for this based on the type of information flows wherein video movies are always transmitted from one transmitting site and music is always transmitted from a different transmitting site or the information flows are stored on different servers or at spatially different sites. This allows not only optimization of the procedure from the transmitting side, but rights administration can also be provided, adapted to the particular type of information flow.

It is further proposed that the information sources are linked in order to prepare the information flow. For example, the information flow can be assembled from different sources. For example, if different scenes from a video movie are stored on different servers, they are linked together ready to be retrieved in the correct sequence. When the information flow is transmitted, the corresponding sources are called in their predefined sequence to enable a continuous information flow. This embodiment is additionally suited to use with interactive computer games wherein different levels are held in readiness by different transmitting sites. The link to additional receiving sites can be provided, for example, for an interactive computer game in which several different, independent receiving sites play one common game.

In order to coordinate preparation of the information flow, in particular with several transmitting sites, it is proposed that the preparation of the information flow is controlled by a central site. With the central site, communication with the receiving site can additionally be established so that, for example, control commands from the receiving site are communicated to the pertinent responsible transmitting site. The embodiment proves to be particularly advantageous if the transmitting sites belong to different countries.

The central site can additionally be provided for the purpose of assembling the information flow by the central site ready for retrieval. This proves to be particularly advantageous when the information flow is distributed among several transmitting sites. For example, the central site assembles the information flow and buffers it on a retrieval server ready for retrieval. Rapid retrieval of the information flow can be achieved, allowing costs for a communications link to be reduced.

Provision can further be made for an overview to be created by the central site. All the information related to the information flow or related to all available information flows can be collected in the central site ready for retrieval, advantageously allowing an overview to be created with minimal expenditure. The additional advantage for the receiving site is that the overview can be obtained at one central site for all information flows. This allows the receiving site to obtain complete information about the potential information flows in a simple manner. The overview can be of low-quality resolution to reduce the required transmitting capacity.

In a further embodiment, it is proposed that the authorization is assigned through the central site. This makes it possible to suitably assign an authorization adapted to the number, the type and the scope of the information flows. What central authorization achieves additionally is that only a single site exists for the assignment of an authorization. This simplifies operating procedures.

Provision can also be made for the authorization to be assigned for several information flows. For example, the authorization may be valid for any category of video movies, pieces of music, computer games or similar. The authorization contains, for example, a time window in which any number of information flows within a class can be selected and transmitted. For example, authorization can be provided which permits only the transmission of information flows for pieces of classic music by Mozart. One example provides for the transmission of animated movies, for example. Naturally, authorizations for computer games, online games or similar can also be assigned over a central access server in return for pre-payment by opening an account. The authorizations can have a time-limited validity.

In addition, it is proposed that the authorization is assigned for a predefinable time period. The predefinable time period can be any time unit, for example, one or several days, a week, a month or even a year or similar. Additionally, of course, additional conditions can be linked to the authorization, such as for example, the restriction to a specific type of information flows. Additionally, advertising can be added in a controlled manner. Acquisition of additional authorizations through a bonus system or similar, for example, can be arranged.

In an advantageous further development, it is proposed that the authorization is reviewed. Reviewing in this context means not simply that a valid code must exist, verification of the receiving site is required in addition, for example by verifying personal data or the like about the recipient. Verification can be made, for example, by means of suitable materials such as an identity card, bank cards, smart cards or similar with which additional information for verification of a receiving party can be provided. Moreover, provision can be made for the receiving site to have a code which can also be verified. It can be arranged for the authorization to be valid only for specific receiving sites or receiver codes. This does not have to be only a single receiving site, it can also be an authorization that is valid for multiple receiving sites. This is advantageous, for example, if several authorized receiving sites are to receive transmissions of the information flows at the same time by means of one authorization. An arrangement of this type can be made in the household of a family in which several receiving sites for individual family members are given a common authorization.

In order to reduce the possibility of manipulation, it is proposed that the check of the authorization is repeated during the transmission of the information flow. The check can be repeated at specific discrete points in time or on a continuous basis. The points in time for the verification can be selected to be discrete, equally spaced or even stochastically. The information flow is transmitted only for as long as the authorization is valid. If the authorization is no longer valid, the transmission can be canceled. In addition, of course, a corresponding message to the transmitting site can also be provided.

In accordance with a further embodiment, the authorization can expire after the transmission is canceled. In this way, manipulation of the method in accordance with the invention can be prevented because the opportunity does not exist of using an authorization multiple times if it is provided only for the transmission of a single information flow on a continuous basis.

It is further proposed that the authorization includes permission to store the information flow on an information carrier. An information carrier can be, for example, electronic storage, such as a RAM, a hard disc or similar, or it can also be an information carrier such as a CD, DVD, cassette or similar. The information flow can, for example, be recorded optically or magnetically, electrically, holographically, mechanically (e.g. record) or in a similar way. In this way, the result is that the receiving site can replay the information flow at any other point in time as often as wanted. For example, the information flow may not contain specific features that allow it to be stored. If the necessary authorization is lacking, it can be arranged for the information flow to have features that prevent its being stored on an information carrier. This can be achieved, for example, through additional data or information that block a storage function or at least interfere with the recording of the data to such an extent that it can be replayed only with considerable effort or not at all.

In one embodiment, it is proposed that the information flow is stored at least temporarily by the receiving site. This is volatile storage which is expedient in order to be able to reassemble an information flow transmitted partially in parallel in its correct sequence. For example, in the transmission of an information flow over the Internet, said information flow is divided into data packages that reach the receiving site along different paths and at different times. The data packages are reassembled at said receiving site and the original information flow is recovered.

It is additionally proposed that the information carrier be erased following the replay of the information flow. With this arrangement the information flow can be played back once from the information carrier. This is particularly advantageous when, as already discussed previously, the information flow first has to be re-assembled in its correct sequence from different partial information flows at the receiving end. It can be arranged additionally that the information carrier itself can play back the information flow only once. The playback itself destroys the information stored on the information carrier so that in fact only a one-time playback is guaranteed. An information carrier of this type can be, for example, a CD, DVD or another suitable optical storage medium the information structure of which is simultaneously destroyed again when it is read out by means of a laser beam.

It is further proposed that analysis of biometric data is used in order to verify the authorization. Thus, for example, a sensor unit for biometric data is provided at the receiving site which can be scanned at the transmitting end. Biometric data can be a fingerprint, for example, an iris scan or the like. The biometric data can be compared with data from an identity card or biometric data on file at the central site. This embodiment has the advantage of allowing information flows that are classified as secret to be transmitted only to authorized receiving sites.

In a further advantageous development of the present invention it is proposed that the information flow be encoded for transmission. The coding can be either analog or digital, preferably depending on whether the information flow is available in analog or digital form for transmission. The coding can be carried out by means of known coding algorithms such as are familiar specifically from mathematics and cryptology. The potential effect is that the information flow cannot be picked up in an authorized manner by third parties who tie into the communications channel. In this way, confidential information flows can be transmitted that contain, for example, personal information or information that must be kept secret.

It is furthermore proposed that the information flow is provided with a redundancy. The redundancy makes it possible to receive the information flow in full at the receiving site, even if the communications channel is affected by interference. For example, error correction measures such as CRC block codes, nesting and the like can be provided. In addition, several codes can be combined, such as two block codes with nesting and the like. A high degree of protection from interference can be achieved for the information flow.

In accordance with a further embodiment, a different information flow can be selected during the transmission. For example, an authorization allows switching to a different movie that belongs to the same class or the like. If there is no further interest in the selected information flow on the receiving side, a different potential information flow can be advantageously selected. Furthermore, it can be arranged for only excerpts of different information flows to be transmitted to provide an overview at the receiving site as to which information flows might be of interest. Thus, the recipient can make a preselection of information flows on the basis of a transmission of this kind. In practical terms, this means that, for example, excerpts from various movies are transmitted and the recipient can obtain an overview of the various movies that might be of interest. He accordingly receives information about the movies so that he can select a later requested movie according to the level of interest. For example, provision can be made that switching is offered only within one category of information flows.

In accordance with an advantageous further embodiment, it is proposed that a network is used as the receiving site. The network can be provided in a household to which several PCs and/or television sets are linked. A home entertainment station can also be provided. The receiving site has several playback possibilities or playback devices available which can be provided and selected as needed for the information flow. The network can be created from a local network, for example, an intranet or similar, it can be also created from a TV cable network or similar or from a combination thereof.

In accordance with a further development, the information flow is replayed at predefinable playback location at the receiving site. The information flow can, for example, be limited to a specific predefinable playback location. In this way, the information flow is not transmitted to any number of playback locations.

In accordance with a further development, the playback location is switched during the transmission of the information flow. This makes it possible to reroute the information flow from one playback location to another playback location. This can be advantageous, for example, when the playback of a video movie is to be switched from the kitchen to the living room in a residence, for example, when the meal is over and the more pleasant atmosphere of the living room is to be used to enjoy the playback.

In an advantageous further development, it is proposed that the information flow is transmitted only to a playback location registered for this information flow. In this way, protection of minors and children can be implemented wherein specific categories or classes of information flows cannot be transmitted to playback locations where they are accessible to minors or children. To this end, as an example, the playback locations transmit their own codes to the transmitting site, the transmitting sites verify the acceptability of the codes and begin the transmission or not depending on whether they are acceptable.

BRIEF DESCRIPTION OF THE DRAWINGS

Additional advantages and features can be found in the following description of embodiments. Essentially unchanged components are identified with the same reference numeral. In addition, reference is made to the description of the embodiment in FIG. 1 with respect to identical features or functions. The drawings are schematic drawings and serve only to clarify the following embodiments.

FIG. 1 shows schematically an overview of a system for implementing the method in accordance with the invention and FIG. 2 shows schematically how an authorization is structured.

DETAILED DESCRIPTION OF THE PREFERRED EMBODIMENTS

Figure 1:
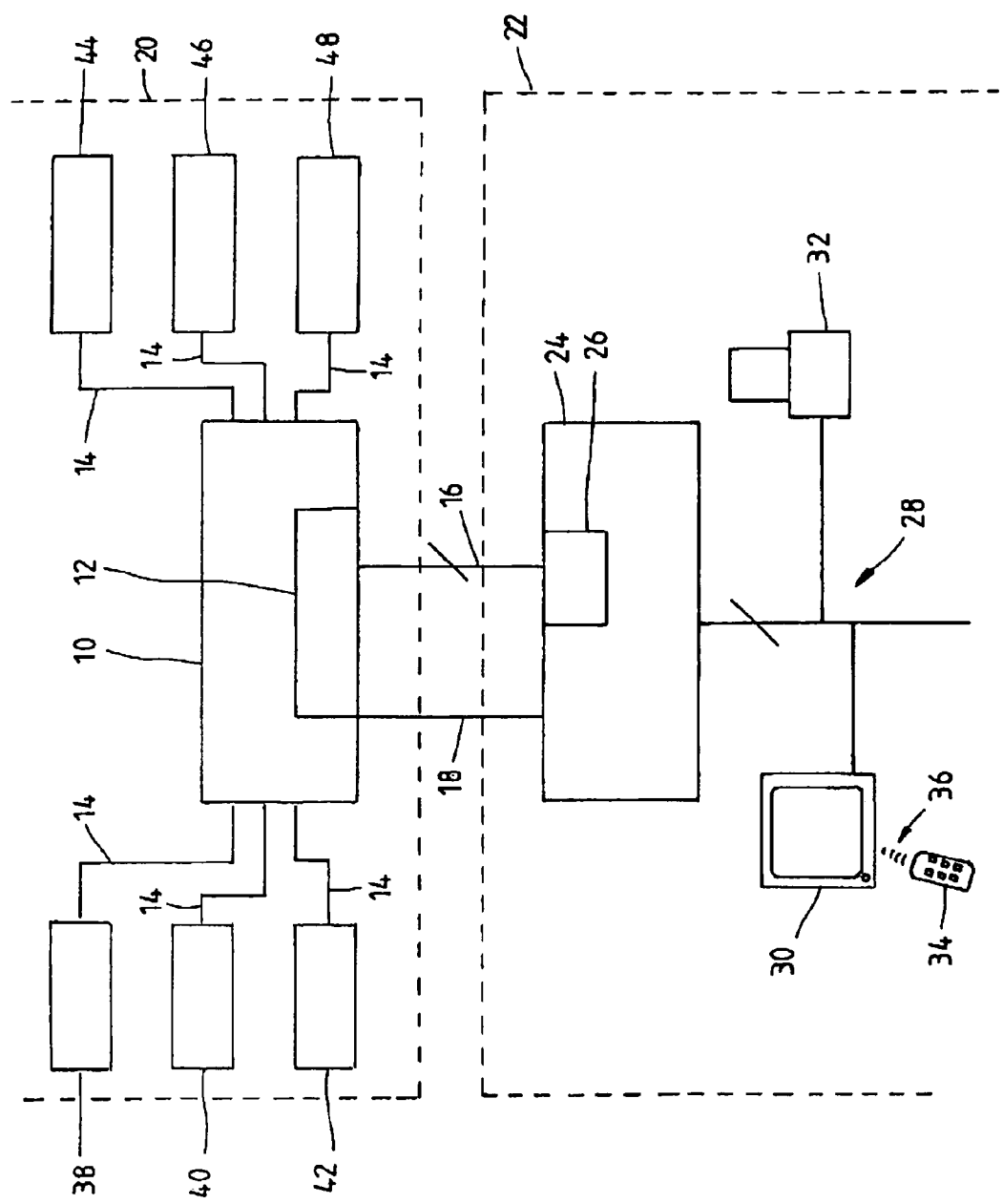

FIG. 1 shows a central site 10 with a retrieval server 12 that is connected through communications links 14 to servers 38 to 48 that each have different categories or classes of information flows. Server 38 contains adventure movies, server 40 documentaries, server 42 fantasy movies, server 44 classical music, server 46 pop music and server 48 traditional folk music.

Transmitting site 20 is linked through a landline telephone connection 18 to a receiving site 22. There is in addition a cable TV network 16 located between the transmitting site 20 and the receiving site 22 by means of which the information flows can be transmitted unidirectionally from the transmitting site 20 to the receiving site 22.

The receiving site 22 has a communications unit 24 that is hooked up to both the telephone link 18 and to the cable TV network 16. The communications unit 24 further has a volatile memory unit 26 that is capable of storing a predefined quantity of information from an incoming information flow. The volatile memory unit 26 is configured here as a RAM.

The communications unit 24 is additionally in communication with a local intranet 28 of the receiving unit 22. In addition, a PC 32 and a television set 30 are connected to the local intranet 28. The television set 30 also has a remote control unit 34 that can control the television set 30 over an IR communications link 36. The purpose of the remote control unit 34 is additionally to deliver control commands over the television set 30, the intranet, the communications unit 24 and the telephone line 18 to the transmitting site 20.

A sequence for the method in accordance with the invention can be implemented in the system as follows as shown in detail in FIG. 1. A user, not shown, in the area of the transmitting site 20 plans to watch a documentary. To this end, he establishes a communications link to the transmitting site 20 by means of the PC 32. A dialer there, not shown, is activated that establishes a communications link over the local intranet 28, the communications unit 24 and the telephone line 18 to the central office 10 of the transmitting site 20. The central office 10 now generates an overview of all the available information flows, i.e., in the present instance, a summary of the movies and the music selections that are ready for retrieval on the various servers of the transmitting site 20. This overview can have an appropriate structure and be browsed by means of a suitable program on the PC 32 for specific predefined information flows. The user selects a documentary that is now downloaded through the central office from the server 40 onto the retrieval server 12. At the same time, the central office 10 transmits an authorization 52 over the communications link back to the PC 32.

One possible configuration for the authorization 52 is shown in FIG. 2. The authorization consists of an alphanumeric sequence of digits whose first five digits are a continuous authorization number of alphanumeric characters. This is followed by a group 54 for a time period code that is crucial to the validity of the authorization. In the present instance, the authorization is to be valid for two hours after the start of the information flow. In the present instance, this segment has six characters. This is followed by a segment 56 with five characters in which a category code is stored that in the present instance applies to the class or category of the information flows. In the present instance, the code matches the selection of the category documentary. The last segment 58 with nine characters is unused for the time being.

With the return transmission of the authorization, the PC 32 then inserts verification data into segment 58 and transmits the authorization back to the central office 10. The central office checks the verification segment and stores the completed authorization 52 in a memory (not shown).

The user now starts the transmission of the information flow by making appropriate entries on the PC 32, specifically for the selected documentary from the retrieval server 12 over the cable TV network, the communications network 24 and the local intranet 28. The playback takes place on the PC. During the transmission of the information flow, the telephone link 18 is maintained. As will be shown in what follows, it is possible to control the transmission of the information flow over this telephone link 18.

If the user now decides to change his location at the receiving site 22, switching from the PC 32 set up in his study to the television set 30 set up in his living room, for example, he will transmit a stop command to the central office 10 through a suitable entry on his PC 32. Said central office receives the stop command and stops the transmission of the information flow from the retrieval server 12. Information that can be displayed visually is now transmitted from the central office 10 in place of the information flow in a form such that "Information stopped" is shown on the screen.

The user now switches to his television set 30 which he puts into the active operating mode by means of the remote control unit 34 over the IR communications link 36. Using the remote control unit 34, the user selects the channel that is provided for the reception of the information flow over the local intranet 28. There he receives the display as shown on the monitor of the PC 32.

Using the remote control unit 34 and by activating a key combination, the user can transmit a command to the television set 30 that recognizes said command as a control signal to be transmitted to the transmitting site 20. The television set 30 transmits the command "Continue information flow" over the known communications link to the central office 10. Said central office actuates the retrieval server 12 so that the transmission of the information flow is continued from the retrieval server 12 to the receiving site 22.

In the present embodiment, continued operation of the PC 32 is no longer necessary, for which reason said PC can be shut down and switched off after passing off the incoming information flow to the television set. Control of the information flow is now handled exclusively through the television set 30 in conjunction with the remote control unit 34.

With the transfer of the information flow from the PC 32 to the television set 30, the authorization 52 is transferred from the PC 32 to the television set 30. The purpose of said transfer is so that the central office 10 can check the validity and the presence of the authorization at stochastically distributed time intervals. To do this, a scan signal is transmitted over the telephone line 18 to the communications unit 24 which, in turn, scans the existing authorization 52 of the target site of the information flow over the intranet 28 and transmits it to the central office 10. The central office 10 checks the authorization 52 and compares it with a stored value. In this way manipulation of the authorization 52 can be detected. If the authorization 52 has been manipulated, the transmission of the information flow is immediately terminated.

If the user intends to have one part of the information flow transmitted repeatedly, he enters the appropriate control commands over the remote control unit 34 which are then transmitted in the prescribed way to the central office 10. The central office interrupts the transmission of the information flow from the retrieval server 12 and prompts it to continue the transmission of information at a predetermined point.

If the user decides that the information flow he selected is of no interest and instead he would like to have a different information flow transmitted, he will again request the overview from the central office 10 and select a different documentary. It should be noted that the current authorization 52 is intended only for documentaries. A different class or category cannot be selected with this authorization. The user now switches to a different documentary and commences the transmission of its information flow.

In an alternative embodiment, the verification segment is linked to the corresponding playback device. For example, the verification segment can contain an identification for the PC 32 or the television set 30. In this case, switching the playback from the PC 32 to the television set 30 or the reverse is not possible.

In a further alternative to the present embodiment, a connection over the Internet is used in place of the telephone link 18 and the cable TV network 16. In this instance, the communications link is configured to be bidirectional so that a separate telephone link 18 is not required. Both the transmission of the information flow and the return transmission of control commands and of the authorization code takes place bidirectionally only over the Internet. In this embodiment, it further proves advantageous that the communications unit 24 has a volatile memory unit 26. As is known, information flows are converted into data packages that are transmitted individually over different paths on the Internet to the receiving site 22. They arrive there in an almost random sequence. The memory unit 26 now makes it possible for the communications unit 24 to reassemble the individual data packages in their correct sequence and thus to retrieve the original information flow to be transmitted. Said information flow is then fed into the intranet 28 in a predetermined way.

In accordance with a further embodiment, the transmission of an information flow is distributed sequentially over several servers. The complete information flow is not assembled until it reaches the retrieval server so that it can be transmitted correctly as intended.

In a further embodiment, the user can specify a communications channel at the same time as he applies for authorization. Said channel can consist, for example, of a telephone link, the cable TV network, the Internet or another available communications link. In this way the user can influence the quality and costs of transmitting the information flow.

The embodiments shown in the Figures serve only to clarify the invention and place no restrictions on said invention.

What is claimed is:

1. A method for transmitting information streams from a communication unit of a transmitting site of a provider to a communication unit of a receiving site of a user, the method comprising:

providing a plurality of the information streams, by a computer processor of the transmitting site, the information streams having a predetermined data format, the information streams being stored at the transmitting site, wherein the information streams are held available upon request of the receiving site;

providing a plurality of communication channels of different technologies for transmitting the plurality of information streams directly from the transmitting site to the receiving site, wherein the plurality of communication channels includes cable, satellite, and wireless local area network;

generating authorizations, by the computer processor of the transmitting site, the authorizations including authorization codes;

allocating the authorizations, by the computer processor of the transmitting site;

generating, by the computer processor of the transmitting site, an overview of the plurality of information streams that are available to be sent from the transmitting site to the receiving site;

transmitting, by the computer processor of the transmitting site, the overview to the receiving site;

in preparation for selecting an information stream, acquiring, the generated authorization from a source other than the transmitting site;

providing, the acquired authorization to the receiving site;

selecting an information stream from the overview, by a computer processor of the receiving site;

inserting, by the computer processor of the receiving site, verification data into a segment of the acquired authorization;

requesting transmission by submitting, by the computer processor of the receiving site, the acquired authorization from the receiving site to the transmitting site in order to request transmission of the selected information stream from the transmitting site;

selecting, by the computer processor of the receiving site, a selected communication channel from the plurality of communication channels;

indicating, by the computer processor of the receiving site, the selected communication channel to the transmitting site;

checking, by the computer processor of the transmitting site, the verification data from the segment of the acquired authorization submitted by the computer processor of the receiving site;

authorizing, by the computer processor of the transmitting site, the transmission of the selected information stream from the transmitting site to the receiving site based on the acquired authorization submitted by the computer processor of the receiving site; and transmitting, by the computer processor of the transmitting site, the selected information stream over the selected communication channel directly from the transmitting site to the receiving site.

2. The method of claim 1, wherein the selected information stream is transmitted as an analog or digital signal.

3. The method of claim 1, wherein the selected information stream is transmitted on a limited-time basis.

4. The method of claim 1, wherein the selected information stream is transmitted through a controlled transmission.

5. The method of claim 4, wherein recipient controls are used to control the transmission of the selected information stream.

6. The method of claim 1, wherein preparation of the selected communication channel can be predefined by the computer processor of the receiving site.

7. The method of claim 1, wherein the selected information stream is transmitted at least partially in parallel over the selected communication channel.

8. The method of claim 1, wherein the selected channel is bidirectional.

9. The method of claim 1, wherein the receiving site commands are transmitted, by the computer processor of the receiving site, over a second communication channel to the transmitting site, the second communication channel being different than the selected communication channel.

10. The method of claim 1, further comprising linking multiple information stream sources to prepare the selected information stream.

11. The method of claim 1, wherein preparation of the selected information stream is controlled through a central office.

12. The method of claim 11, wherein the selected information stream is compiled by the central office and made ready for retrieval.

13. The method of claim 11, wherein the overview is generated by the central office.

14. The method of claim 11, wherein the authorization is assigned by the central office.

15. The method of claim 1, wherein the authorization is assigned for several information streams.

16. The method of claim 1, wherein the authorization is assigned for a predefinable period of time.

17. The method of claim 1, wherein the authorization is verified.

18. The method of claim 17, wherein the verification of the authorization is repeated during the transmission of the selected information stream.

19. The method of claim 1, wherein the authorization expires after cancelation of the transmission of the information stream.

20. The method of claim 1, wherein the authorization includes permission to store the selected information stream on an information carrier.

21. The method of claim 1, wherein the selected information stream is stored at least temporarily by the receiving site.

22. The method of claim 20, wherein the information carrier is erased after playing back the selected information stream.

23. The method of claim 17, wherein analysis of biometric data is used to verify the authorization.

24. The method of claim 1, wherein the selected information stream is encoded for transmission.

25. The method of claim 1, wherein the selected information stream is provided with a redundancy.

26. The method of claim 1, wherein a different information stream is selected during the transmission of the selected information stream.

27. The method of claim 1, wherein a network is used as the receiving site.

28. The method of claim 1, wherein the selected information stream is played back only at a predefinable playback location.

29. The method of claim 1, wherein a playback location is switched during the transmission of the selected information stream.

30. The method of claim 1, wherein the selected information stream is transmitted only to a playback location registered for the selected information stream.

31. The method of claim 1, wherein the acquiring the authorization includes dialing, by the user, a toll telephone number.

32. The method of claim 1, wherein the plurality of communication channels further includes telephone, cellular phone network, and line of sight communication links.

* * * * *